United States Patent
Tanaka et al.

(10) Patent No.: US 6,717,816 B1
(45) Date of Patent: Apr. 6, 2004

(54) SHOCK ABSORBING APPARATUS FOR INTERNAL COMPONENT ASSEMBLED WITHIN ELECTRONIC APPARATUS

(75) Inventors: Wataru Tanaka, Kawasaki (JP); Ikki Tatsukami, Kawasaki (JP); Takashi Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/695,968

(22) Filed: Oct. 26, 2000

(30) Foreign Application Priority Data

Mar. 30, 2000 (JP) .................................... 2000-094900

(51) Int. Cl.[7] .............................................. H05K 7/00
(52) U.S. Cl. ...................................... 361/728; 361/683
(58) Field of Search .............................. 361/683, 728, 361/684, 685, 686, 725, 747; 248/638

(56) References Cited

U.S. PATENT DOCUMENTS

| | | | | |
|---|---|---|---|---|
| 5,943,208 A | * | 8/1999 | Kato et al. | 361/685 |
| 6,005,768 A | * | 12/1999 | Jo | 361/685 |
| 6,040,980 A | * | 3/2000 | Johnson | 361/685 |
| 6,094,357 A | * | 7/2000 | Deubler et al. | 361/782 |
| 6,256,195 B1 | * | 7/2001 | Liao | 361/685 |
| 6,259,599 B1 | * | 7/2001 | Gamble et al. | 361/685 |
| 6,283,438 B1 | * | 9/2001 | Shimada et al. | 248/694 |

FOREIGN PATENT DOCUMENTS

| | | |
|---|---|---|
| EP | 0 917 036 | 5/1999 |
| JP | 11-177261 | 7/1999 |
| JP | 11177261 | * 7/1999 |
| JP | 11-242881 | 9/1999 |

* cited by examiner

*Primary Examiner*—David Martin
*Assistant Examiner*—Thanh S. Phan
(74) *Attorney, Agent, or Firm*—Armstrong, Kratz, Quintos, Hanson & Brooks, LLP

(57) ABSTRACT

A shock absorbing unit includes a fixation plate superposed and detachably fixed on the outer surface of an internal component. An erect plate continuously extends from the fixation plate so as to stand on the outer surface of the internal component. A pair of elastic leaves are superposed and adhered on front and back sides of the erect plate. The elastic leaves serve to absorb an impact or vibration. The internal component can be protected or separated from the impact or vibration. Moreover, the shock absorbing unit can be attached to or detached from the internal component as a whole in a relatively facilitated manner. When the elastic leaves are to be replaced with new ones, the shock absorbing unit as a whole may be replaced with a new one without unsticking the elastic leaves from the erect plate.

3 Claims, 7 Drawing Sheets

SHOCK ABSORBING APPARATUS FOR INTERNAL COMPONENT ASSEMBLED WITHIN ELECTRONIC APPARATUS

BACKGROUND OF THE INVENTION

1. Field of the Invention

The present invention relates to a portable electronic apparatus such as a notebook personal computer, a personal digital assistant (PDA), and the like. In particular, the invention relates to an electronic apparatus comprising: an enclosure; an internal component, such as a hard disk drive (HDD), contained within the enclosure; and a shock absorbing unit attached to the internal component.

2. Description of the Prior Art

In general, a notebook personal computer includes a shock absorbing member sandwiched between an internal component, namely, a built-in HDD and the inside surface of the wall defining an internal space for accommodating the built-in HDD, as disclosed in Japanese Patent Application Laid-open No. 11-242881. The shock absorbing member serves to absorb an impact acting on the external housing of the notebook personal computer. The built-in HDD can thus be protected from the impact.

In the aforementioned Laid-open No. 11-242881, the shock absorbing member is adhered directly on the wall defining the internal space for the built-in HDD. Accordingly, when the shock absorbing member is to be exchanged, it is troublesome to remove the old shock absorbing member from the wall and to restore the clean surface of the wall, for example, by removing an adhesive remaining on the wall.

As shown in Japanese Patent Application Laid-open No. 11-177261, the shock absorbing member may be separated from the external housing of the electronic apparatus and the built-in HDD, respectively. Such separation is supposed to eliminate the aforementioned troublesome operations at the exchange of the shock absorbing members. In this case, the shock absorbing member comprises a pair of halves sandwiching the built-in HDD. The built-in HDD should be kept between the unsteady halves when it is installed between the external housing and the cover. Accordingly, it is very troublesome to exchange the built-in HDDs although the exchange of the shock absorbing members can be effected in a facilitated manner as compared with the art disclosed in the aforementioned Laid-open No. 11-242881.

SUMMARY OF THE INVENTION

It is accordingly an object of the present invention to provide a shock absorbing apparatus for an internal component designed to be installed in an electronic apparatus, capable of contributing to an efficient and facilitated operation in exchanging a shock absorbing member and the internal component.

According to a first aspect of the present invention, there is provided an electronic apparatus comprising: an enclosure; an internal component; a fixation member stationary on the internal component; an erect plate continuously extending from the fixation member so as to stand on an outer surface of the internal component; a shock absorbing member disposed on front and back sides of the erect plate; a receiving section disposed in an internal space within the enclosure so as to receive the shock absorbing member on the back side of the erect plate; and a holder member disposed on the shock absorbing member on the front side of the erect plate so as to hold the erect plate as well as the shock absorbing member between the receiving section and the holder member itself. The shock absorbing member may be an elastic thin piece or leaf in the electronic apparatus. Moreover, the fixation member may be detachably attached to the internal component.

Otherwise, according to a second aspect of the present invention, there is provided an electronic apparatus comprising: an enclosure; an internal component received within an internal space defined in the enclosure; a fixation plate superposed and detachably fixed on the outer surface of the internal component; an erect plate continuous from the fixation plate so as to stand on the outer surface of the internal component; a pair of elastic leaves superposed and adhered on front and back sides of the erect plate; a stationary support disposed in the internal space so as to receive the elastic leaf on the back side of the erect plate; and a holder member disposed on the elastic leaf on the front side of the erect plate so as to hold the erect plate as well as the elastic leaves between the stationary support and the holder member itself.

A combination of the internal component, the fixation plate, the erect plate and the elastic leaves is allowed to establish an internal component assembly or unit in the electronic apparatus of this type, for example. The holder member serves to hold the internal component assembly within the internal space of the enclosure. When an impact acts on the enclosure, the impact can reliably be absorbed at the elastic leaves before the impact is transmitted to the internal component, the fixation plate and the erect plate from the holder member and the stationary support. Accordingly, the internal component can be protected or separated from the impact or vibration. Moreover, the internal component assembly as a whole can be handled in a facilitated manner as compared with the case where the internal component, the fixation plate and the erect plate are separately handled.

In addition, a combination of the fixation plate, the erect plate and the elastic leaves is also allowed to establish a shock absorbing unit in the electronic apparatus. Such a shock absorbing unit can be attached to or detached from the internal component as a whole in a relatively facilitated manner. Accordingly, the operation can be facilitated in exchange or replacement of the internal component. When the elastic leaves are to be replaced with new ones because of the deterioration and/or the damage of the elastic leaves, the shock absorbing unit as a whole may be replaced with a new one without unsticking the elastic leaves from the erect plate. It is possible to eliminate a troublesome operation including wiping an adhesive remaining on the surface of the enclosure, for example. The replacement of the internal component and/or the shock absorbing member such as the elastic leaves can be facilitated in this manner.

In particular, the aforementioned shock absorbing unit may be employed to protect an internal or built-in hard disk drive (HDD) within a notebook personal computer, for example. The shock absorbing units are attached to the outer surface of the HDD so as to hold the HDD therebetween. The erect plates of the respective shock absorbing units may stand on the outer surface of the HDD in an upright attitude, for example. In this case, it is preferable that the total thickness of the erect plate and the elastic leaves on the erect plate is set smaller than the thickness of the HDD. Such a smaller thickness enables a reliable shock absorption without an increase in the thickness of the HDD. It should be noted that the shock absorbing unit can be employed to protect any type of an internal component in addition to the aforementioned HDD within the enclosure of the electronic apparatus such as a computer.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
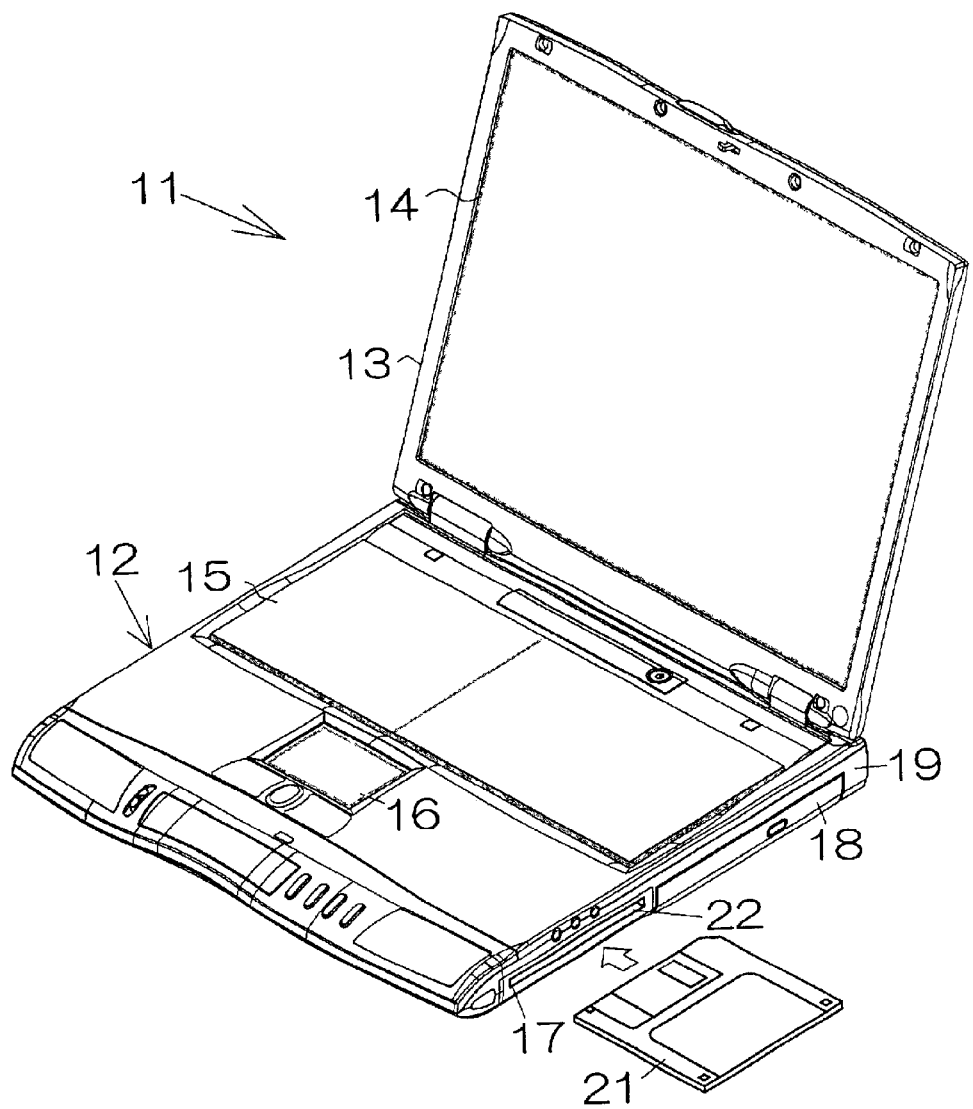
FIG. 1 is a perspective view schematically illustrating a notebook personal computer.

FIG. 1 schematically illustrates a notebook personal computer 11 as an electronic apparatus. The notebook personal computer 11 includes a system unit 12 containing a motherboard, not shown, for example, and a display housing 13 hinged to the system unit 12. A liquid crystal display (LCD) panel unit 14 is installed within the display housing 13.

A central processing unit (CPU) and a memory chip are, for example, mounted on the motherboard. When the CPU operates, the motherboard controls input devices such as a keyboard 15 (keys are not shown) and a pointing device 16 as well as peripheral devices such as a diskette drive (FDD) 17 and a compact disk drive (CDD) 18 installed within the system unit 12. The result of the processing can be displayed on the screen of the LCD panel unit 14.

The FDD 17 is built in an enclosure 19 of the system unit 12. A slot 22 is defined in the front of the FDD 17 at the side face of the enclosure 19 so as to receive a diskette (FD) 21. The diskette 21 can be introduced into the FDD 17 through the slot 22 in the attitude upright to the side face of the enclosure 19.

Figure 2:
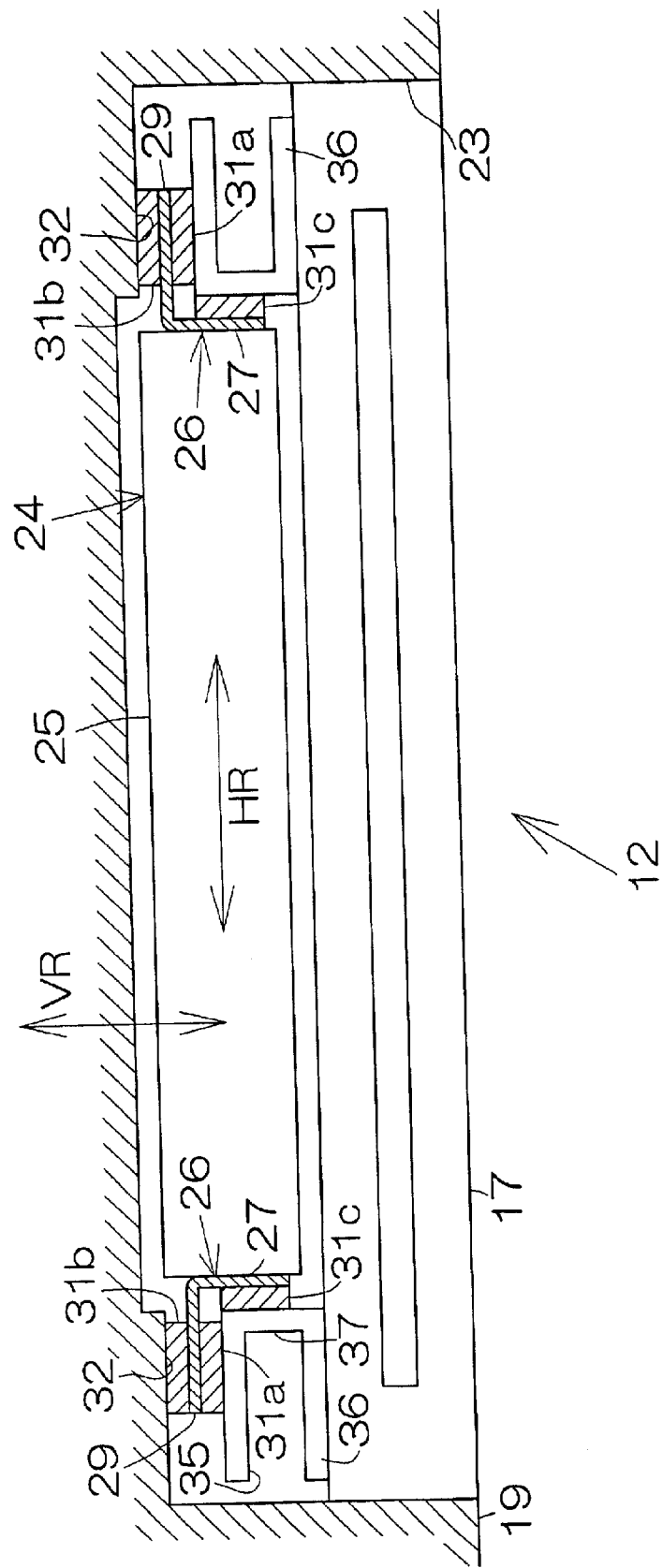
FIG. 2 is a partial enlarged sectional view illustrating an internal space defined within an enclosure of a system unit.
Figure 3:
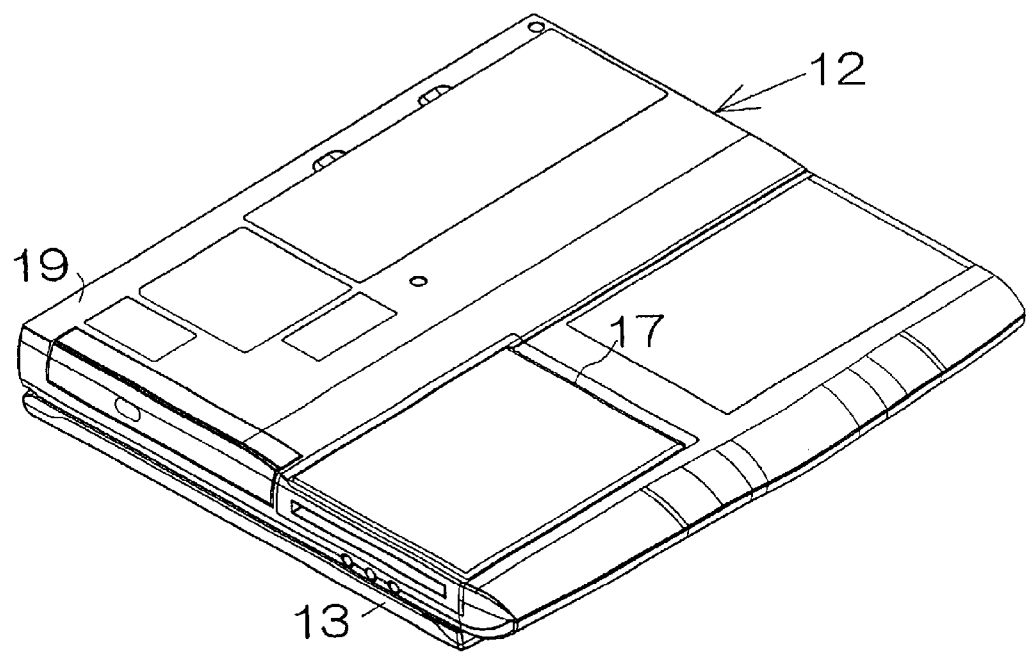
FIG. 3 is a perspective view schematically illustrating the back surface of the notebook personal computer.

As shown in FIG. 2, an internal space 23 can be defined in the enclosure 19 of the system unit 12. The internal space 23 opens at the back surface of the system unit 12. Specifically, when the system unit 12 is placed on a desk for manipulation of the notebook personal computer 11, the opening of the internal space 23 is opposed to the top surface of the desk. The internal space 23 is designed to receive the aforementioned FDD 17 and a hard disk drive (HDD) assembly 24 as an internal component assembly. The FDD 17 closes the opening of the internal space 23. When the FDD 17 is assembled into the internal space 23 in this manner, the bottom surface of the FDD 17 constitutes the back surface of the system unit 12, as shown in FIG. 3.

Referring again to FIG. 2, the HDD assembly 24 includes a hard disk drive (HDD) 25 as an internal or built-in component for the notebook personal computer 11. The HDD 25 includes at least a recording medium or magnetic disk, not shown, extending in a plane along the horizontal direction HR, and a magnetic head, not shown, designed to face each of the front and back surfaces of the magnetic disk, as conventionally known, for example. A pair of shock absorbing units 26 are detachably attached to the HDD 25 at the opposite sides in the horizontal direction HR. The shock absorbing unit 26 functions as a shock absorbing apparatus of the invention.

Figure 4:
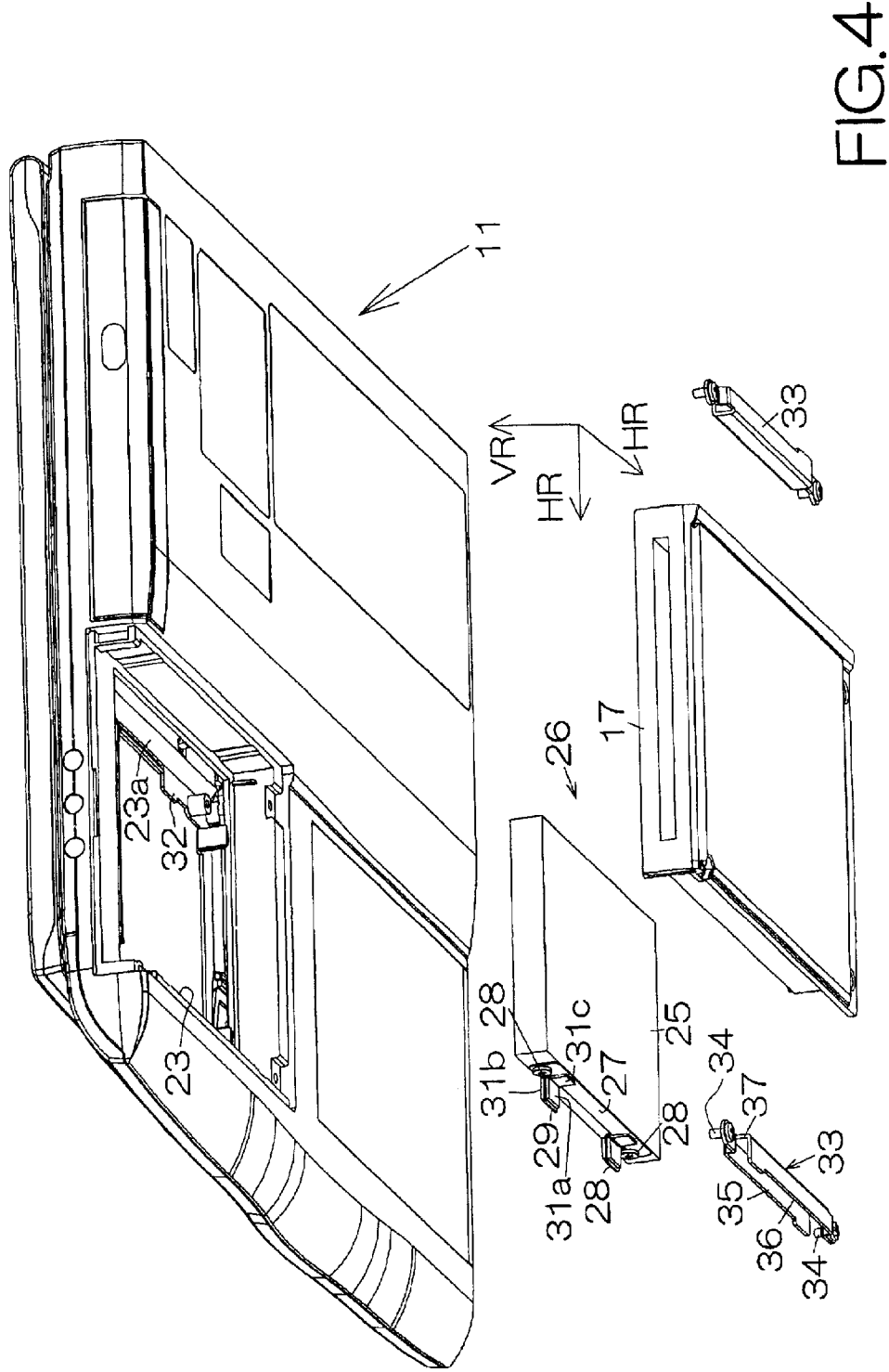
FIG. 4 is an exploded view illustrating the enclosure, a hard disk drive (HDD) assembly and a diskette drive (FDD)

Referring also to FIG. 4, the shock absorbing units 26 include fixation members such as fixation plates 27 superposed on the outer surface of the HDD 25 at the opposite sides in the horizontal direction HR, respectively. A connecting mechanism such as a pair of front and rear screws 28 serves to detachably fix the fixation plate 27 on the side surface of the HDD 25. The fixation plate 27 may extend along the side surface of the HDD 25. The side surface of the HDD 25 may extend in a plane perpendicular to the horizontal direction HR along the specific back-and-forth direction, for example.

A pair of front and rear erect plates 29 continuously extend from the fixation plate 27 so as to stand on the outer surface of the HDD 25. The erect plate 29 may extend in the horizontal direction HR from the opposite side surfaces of the HDD 25. Specifically, the erect plate 29 may be kept in the attitude upright to the side surface of the HDD 25. The front and rear erect plates 29 and the fixation plate 27 can be shaped out of a single metallic plate punched out of a metallic plate material, for example. The punched-out metallic plate may be bent so as to form the erect plates 29 continuous to the fixation plate 27.

Shock absorbing members are disposed on the front and back sides of the respective erect plate 29. The shock absorbing members include rectangular elastic thin pieces or leaves 31a, 31b superposed on the front and back sides of the erect plate 29, respectively. The elastic leaves 31a, 31b may be adhered to the erect plate 29. The shock absorbing members may additionally include rectangular elastic thin pieces or leaves 31c superposed on the surface of the fixation plate 27 at front and rear positions, respectively. The elastic leaves 31c may likewise be adhered to the fixation plate 27. The elastic leaves 31a–31c can be cut off from a large-sized elastic sheet. For example, if an existing cheap material such as a Sorbothane®, distributed from Sorbothane, Inc., is employed as the large-sized elastic sheet, it is possible to remarkably reduce the production cost of the elastic leaves 31a–31c. In addition, employment of such an existing material leads to a facilitated method of production as compared with the case where original elastic leaves or members are to be designed. Efficiency can be improved in production. The elastic leaves 31a–31c are only designed to have an appropriate shock absorption and/or an appropriate vibration isolation.

Receiving sections such as stationary supports or bases 32 are disposed in the internal space 23 for receiving the respective elastic leaves 31b on the back sides of the front and rear erect plates 29. The stationary support 32 may be defined or integrally formed on the top or ceiling surface 23a of the internal space 23. On the other hand, holder members 33 are disposed to contact the respective elastic leaves 31a on the front sides of the front and rear erect plates 29. The holder members 33 are at least restrained from a relative movement to the corresponding stationary supports 32. A connecting mechanism such as a pair of front and rear screws 34 serves to detachably fix the holder members 33 on the top surface 23a of the internal space 23, for example.

The holder member 33 includes a first horizontal plate 35 opposed to the stationary support 32 so as to hold the erect plate 29 as well as the elastic leaves 31a, 31b on the front and back sides of the erect plate 29 between the stationary support 32 and the first horizontal plate 35 itself, and a second horizontal plate 36 extending in parallel with the first horizontal plate 35 at a position spaced from the first horizontal plate 35. A vertical plate 37 serves to connect the first and second horizontal plates 35, 36 to each other. When the HDD assembly 24 is held between the holder members 33 in the horizontal direction HR, the elastic leaves 31c on the fixation plates 27 are received on the respective vertical plate 37. Specifically, a pair of the vertical plates 37 are designed to urge against each other through the HDD 25, the fixation plates 27 and the elastic leaves 31c adhered on the respective fixation plates 27. The first and second horizontal plates 35, 36 and the vertical plates 37 can be shaped out of a single metallic plate punched out of a metallic plate material, for example. The first and second horizontal plates 35, 36 may be formed by bending corresponding shaped portions continuous to the vertical plate 37. If the first and second horizontal plates 35, 36 are formed to shape the holder member 33 into a symmetry around a specific rotation axis, as shown in FIG. 4, any of the first and second horizontal plates 35, 36 can be employed to hold the erect plates 29 against the stationary support 32 in the aforementioned manner. An operator or worker is released from a failure, caused by a wrong orientation of the holder member 33, in attaching the holder member 33. The holder member 33 can smoothly and efficiently be handled.

The shock absorbing unit 26 serves to keep a set of rigid members of the HDD assembly 24, including the HDD 25, the fixation plates 27 and the erect plates 29, spaced from the enclosure 19, the FDD 17, and other rigid structure within the enclosure 19, except the elastic leaves 31a–31c. Even if a strong impact acts on the enclosure 19 of the system unit 12 in the vertical direction VR, for example, the impact can reliably be absorbed at the elastic leaves 31a, 31b, respectively. The HDD 25 can be protected or separated from the impact. This type of the impact may be caused when the notebook personal computer 11 is roughly placed on the desk, for example. On the other hand, even if a strong impact acts on the enclosure 19 of the system unit 12 in the horizontal direction HR, the impact can be absorbed at the elastic leaves 31c. The HDD 25 can again be protected or separated from the impact.

In general, the HDD 25 includes the magnetic head supported on the elastic suspension which has an elasticity in the vertical direction VR larger than that in the horizontal direction HR. When the HDD 25 suffers from an impact in the vertical direction VR, the magnetic head easily tends to collide against the surface of the magnetic disk. If the shock absorbing unit 26 is provided with a larger capability in shock absorption in the vertical direction VR rather than the horizontal direction HR in the aforementioned manner, it is possible to reliably prevent generation of any scar or damage due to collision between the magnetic head and the magnetic disk.

In particular, the total thickness D1 of the erect plate 29 and the elastic leaves 31a, 31b on the front and back sides of the erect plate 29 is preferably set smaller than the thickness D2 of the HDD 25. The smaller thickness D1 enables a reliable shock absorption without an increase in the thickness D2 of the HDD 25. The smaller thickness D1 is supposed to greatly contribute to reduction in the thickness of the enclosure 19 of the system unit 12.

Assume that the HDD 25 is to be exchanged in the notebook personal computer 11. The exchange can in general be utilized to update the performance of the HDD 25. Specifically, the old HDD 25 can be replaced with an HDD of a larger storage capacity. Otherwise, the old HDD 25 can be replaced with an HDD of a faster rotation velocity or data transfer rate.

First of all, a worker removes the FDD 17 out of the enclosure 19, as shown in FIG. 4. The removal of the FDD 17 allows access to the HDD assembly 24 through the opening of the internal space 23 at the back surface of the system unit 12. The HDD assembly 24 is exposed at the back surface of the system unit 12. When the screws 34 are released, the HDD assembly 24 can be removed out of the enclosure 19 along with the holder members 33.

Figure 5:
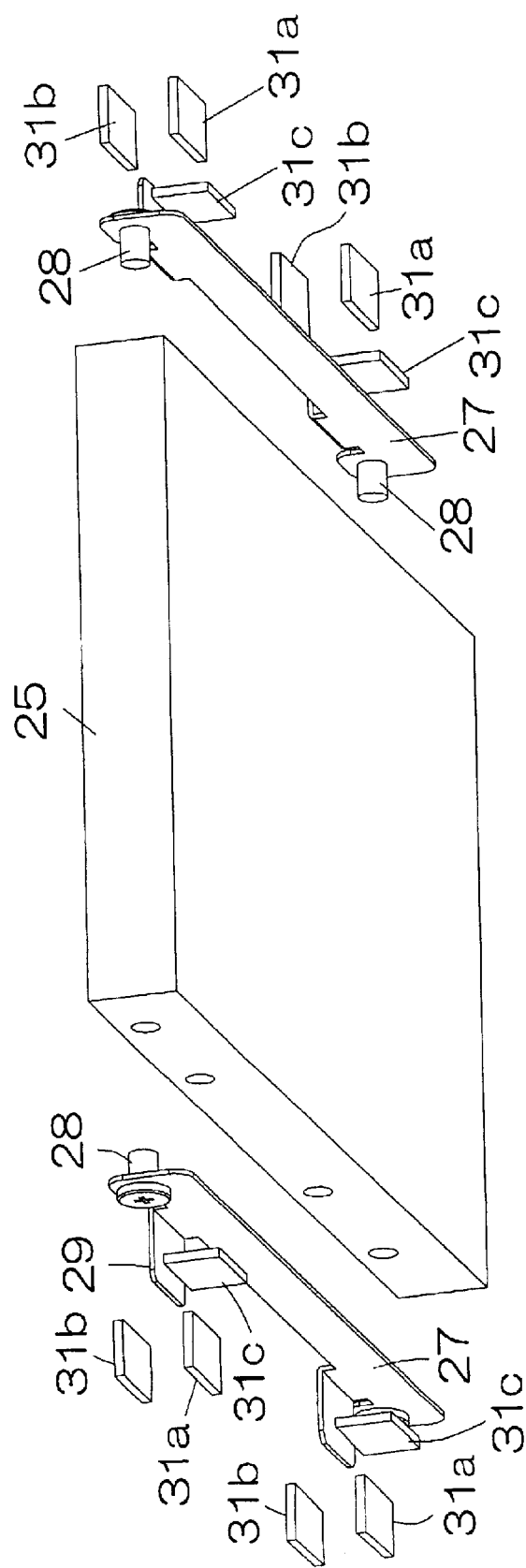
FIG. 5 is an exploded view illustrating the HDD assembly.

Thereafter, when the screws 28 are released, the shock absorbing units 26 can be detached or separated from the HDD 25, as shown in FIG. 5, for example. The shock absorbing units 26 are then attached on a new HDD 25. The thus constructed HDD assembly 24 is subsequently inserted into the internal space 23 defined within the enclosure 19. It should be noted that the HDD assembly 24, including the HDD 25 and the attached shock absorbing units 26, can be replaced as a whole with a new HDD assembly, without detaching the shock absorbing units 26 from the HDD 25.

Now, assume that the elastic leaves 31a–31c are to be replaced with new ones because of the deterioration and/or the damage of the elastic leaves 31a–31c. The HDD assembly 24 is likewise removed out of the enclosure 19. In this case, the overall shock absorbing unit 26, including the fixation plate 27 and the erect plates 19, may be replaced with a new one without unsticking the elastic leaves 31a–31c from the fixation plate 27 and the erect plates 29. Accordingly, it is possible to eliminate a troublesome operation including wiping an adhesive remaining on the surface of the enclosure 19, for example. The replacement of the shock absorbing member can be facilitated.

Figure 6:
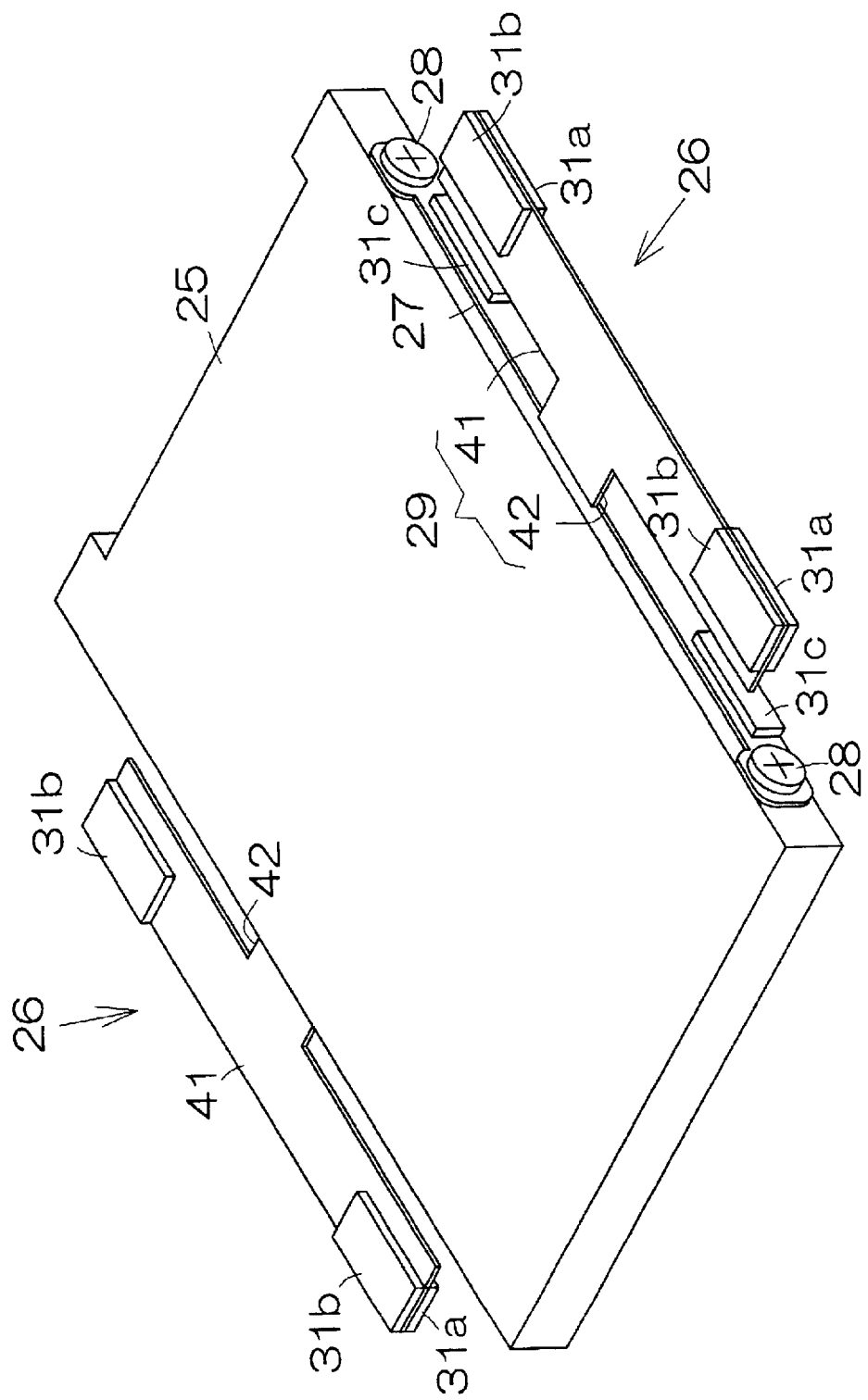
FIG. 6 is a perspective view of the HDD assembly for schematically illustrating a shock absorbing unit according to another embodiment.

As shown in FIG. 6, a shock absorption may be established in the erect plates 29, in addition to the shock absorption at the aforementioned elastic leaves 31a–31c. In this case, the erect plate 29 includes an elongated plate portion 41 extending in the back-and-forth direction supporting pairs of elastic leaves 31a, 31b at front and rear positions, respectively, and a connecting piece 42 extending from the fixation plate 27 to the elongated plate portion 41 at the intermediate position of the elongated plate portion 41 in the back-and-forth direction. The elongated plate portion 41 may be made of a metallic plate having an elasticity to some extent. When the elongated plate portion 41 is held at the front and rear ends between the stationary supports 32 and the holder members 33, the elongated plate portion 41 is allowed to elastically deform at the central section in the back-and-forth direction to some extent. Such an elastic deformation serves to absorb a larger impact in the respective shock absorbing units 26 as compared with the case where the aforementioned elastic leaves 31a–31c are solely employed. It should be noted that the fixation and erect plates 27, 29 are shaped out of a single metallic plate punched out of a metallic plate material, for example.

Figure 7:
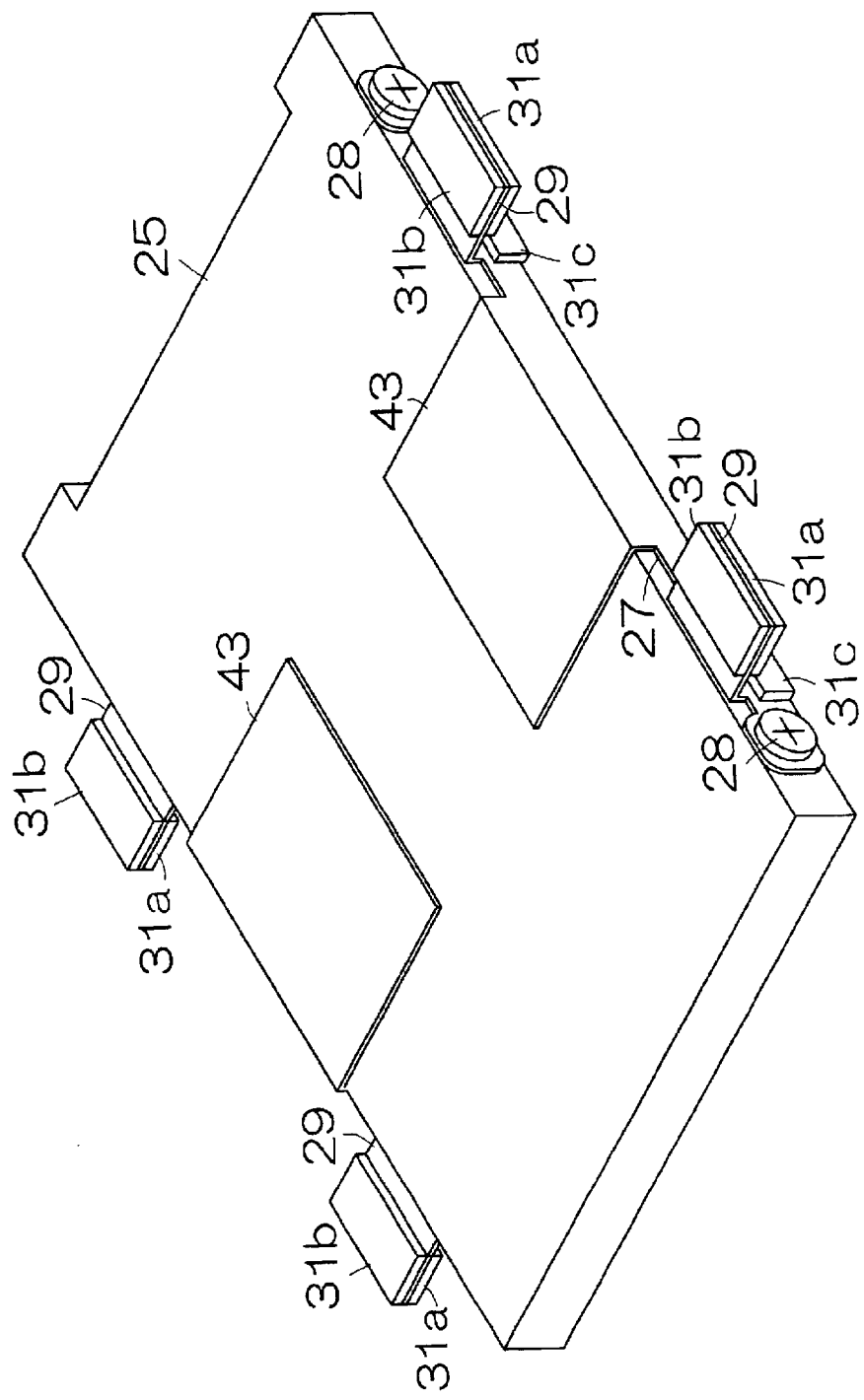
FIG. 7 is a perspective view of the HDD assembly for schematically illustrating a shock absorbing unit according to further embodiment.

In addition, a heat radiation plate 43 may extend from the fixation plate 27 along the outer surface of the HDD 25 so as to reach a heated region of the HDD 25, in the shock absorbing unit 26, as shown in FIG. 7. The heat radiation plates 43 serve to accelerate radiation of heat generated at the heated region, so that rise in temperature can be restrained to the utmost around the heated region. It should be noted that the fixation, erect and heat radiation plates 27, 29, 43 can be shaped out of a single metallic plate punched out of a metallic plate material, for example.

What is claimed is:

1. An electronic apparatus comprising:

an enclosure;

an internal component;

a fixation member stationary on the internal component;

an erect plate continuously extending from the fixation member so as to stand on an outer surface of the internal component;

a shock absorbing member disposed on front and back sides of the erect plate;

a receiving section disposed in an internal space within the enclosure so as to receive the shock absorbing member on the back side on the erect plate; and a holder member disposed on the shock absorbing member on the front side of the erect plate so as to hold the erect plate as well as the shock absorbing member between the receiving section and the holder member itself.

2. The electronic apparatus according to claim 1, wherein said shock absorbing member is an elastic thin piece.

3. The electronic apparatus according to claim 1, wherein said fixation member is detachably attached to the internal component.

* * * * *